J. O. BEWAN.
PORTABLE ACETYLENE GAS GENERATOR.
APPLICATION FILED MAR. 29, 1918.

1,304,251.

Patented May 20, 1919.
2 SHEETS—SHEET 1.

J. O. Bewan,
Inventor

Attorney

J. O. BEWAN.
PORTABLE ACETYLENE GAS GENERATOR.
APPLICATION FILED MAR. 29, 1918.
1,304,251.
Patented May 20, 1919.
2 SHEETS—SHEET 2.
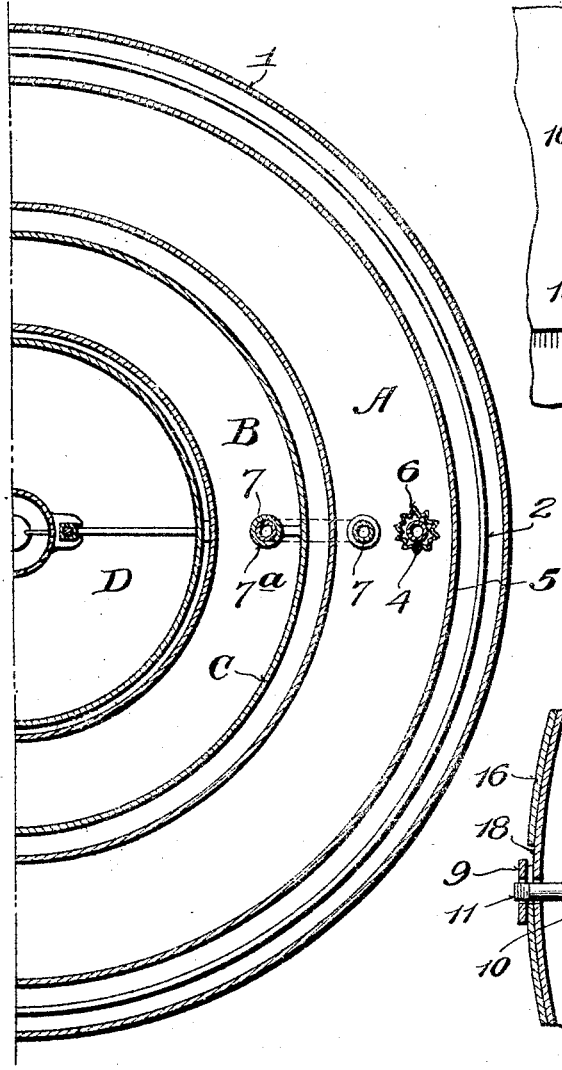
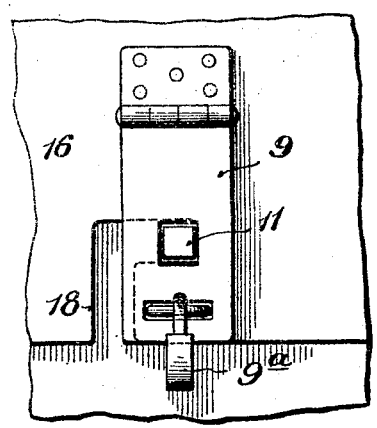
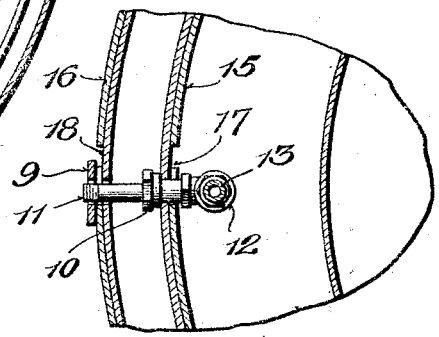
Inventor
J. O. Bewan, ated May 20, 1919.

UNITED STATES PATENT OFFICE.

JAMES O. BEWAN, OF ONLEY, VIRGINIA.

PORTABLE ACETYLENE-GAS GENERATOR.

1,304,251. Specification of Letters Patent. Patented May 20, 1919.

Application filed March 29, 1918. Serial No. 225,427.

*To all whom it may concern:*

Be it known that I, JAMES O. BEWAN, a citizen of the United States, residing at Onley, in the county of Accomac and State of Virginia, have invented certain new and useful Improvements in Portable Acetylene-Gas Generators, of which the following is a specification.

This invention relates to a portable acetylene gas generator or plant adapted especially for army use, cantonments, construction camps and places where a temporary lighting plant is required.

The object of the invention is to combine the entire lighting outfit, generator, standards and burners in one portable device, easily recharged and cleaned, and provided with such safety devices as would be required for a lighting plan operated in places of the character mentioned.

With these objects in view the invention consists in the novel features of construction hereinafter described, pointed out in the claims, and shown in the accompanying drawings in which:

Fig. 2 is a horizontal section on the line 2—2 of Fig. 1.

Fig. 3 is a detail side elevation of a valve and cover locking device.

Fig. 4 is a section on the line 4—4 of Fig. 1.

Figure 1:
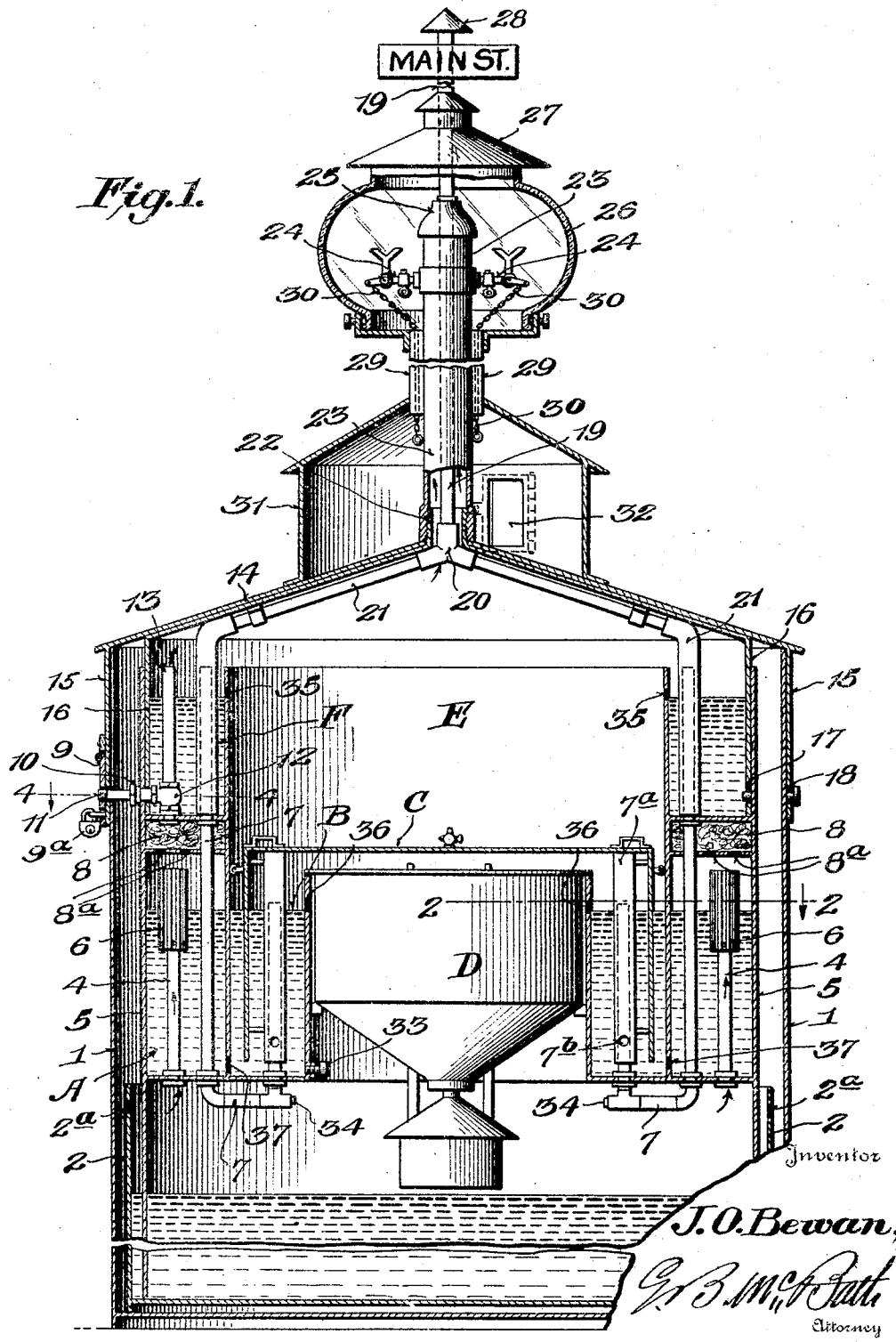
Figure 1 is a vertical section through the complete device.

In the drawings 1 designates the outer tank or casing which is to be sunk into the ground up to the level of a cover locking device, to be hereafter described. Within the outer casing is a water tank 2 of comparatively little depth compared to the outer casing. Hand holes 2ª are formed in the water tank for convenience in lifting the same out for cleaning. An inner tank 5 is arranged within the water tank and extends upwardly nearly to the top of the outer casing. About midway its length the tank 5 is provided with concentric water chambers A and B. Working in the water-seal of the chamber B is a bell C with carbid feed D.

As this bell and feed is the subject matter of my application filed November 17, 1917, Serial No. 202,493 it is unnecessary to show or describe it in detail herein.

Above the bell is a free gas compartment E. Leading upwardly through the water chamber A are gas supply pipes 4 provided with telescoping pipes or sleeves 6, said sleeves being closed at their upper ends, open at their lower ends and internally longitudinally ribbed to space them from the pipes 4. The lower ends of the sleeves dip into the water of the chamber A. Gas passes from the lower portion of the tank 5, where it is generated, through pipes 4, down the sleeves 6, upwardly through the water and through a filter 8, provided with openings 8ª, into an escape pipe, or pipes, 13 and hence to the gas chamber E. The pipe 13 is provided with a rotatable valve 12 having a handle 11. This handle projects through the sides of the device and at its outer end is squared. A hinged shackle carried by the outer wall of a cover 14, as at 9, and provided with a square opening to fit over the outer end of the valve stem or handle, is locked in place by a padlock 9ª. A packing nut 10 is fitted on the cylindrical inner portion of the stem to prevent escape of water from a water seal compartment F arranged above the filter 8.

A blow off pipe 7, which is an important feature of the present invention extends downwardly from the water chamber B, thence upwardly through the chamber A and into the compartment F. Any number of these pipes may be employed, in the drawing I have shown two, arranged on opposite sides of the bell.

The bell carries depending sleeves 7ª that fit over the portions of the blow off pipes 7 extending upwardly in the water chamber B.

A double cover 14 is provided formed by riveting together two plates of different diameter. The under plate forming the cover carries an inner depending flange or rim 15, the upper plate, which is the larger in diameter, has a depending outer flange 16. Both flanges have bayonet slots 17, 18 to receive the valve stems 11.

It will be obvious that the valve stems or handles will serve to lock the cover in place against pressure of gas in the free gas compartment.

The cover carries the uppermost section of the blow off pipe, 19, which by a Y 20 is connected by lateral branches 21, secured to the underside of the cover, of the intermediate section of the blow off pipes. The branches 21 fit over the upper portions of the pipes 7 and dip into the water in the compartments F. A union 22 is secured on the cover 14, surrounding the Y 20 and on this is threaded a pipe section 23 communicating with the gas compartment E and inclosing a portion of the blow off pipe section 19. Adjacent its upper end the pipe 23 carries lateral burner branches 24. The upper end of pipe 23 is closed by a cap 25. The burner branches might have individual globes but I prefer to inclose them in one large globe 26, with ventilating hood 27. Running downwardly from within the globe 26 are pipes 29 containing pull chains 30, the pipes 29 extending into a housing 31 carried by the cover and provided with a door 32, having any suitable kind of lock. A hood 28 is placed over the upper end of the blow pipe section 19 to shield from rain. This pipe section may also serve as a post for carrying a street or guide sign. A drain plug 33 is provided for the water chamber B, drain plugs 34 are provided for the blow off pipe section 7, openings 35 and 36 maintain a high water level for the compartments F and B, and openings 37 serve to maintain an equal water level in compartments A and B.

Under normal operating conditions the gas generated will pass into the free gas compartment E and thence through pipe 23 to the burners. As the lower ends of the pull chains are within the housing 31 and the valve stems are locked against rotation the burners can be lighted only by an authorized party having keys for the shackles and the door 32. This prevents irresponsible persons from tampering with the lights. As this device is intended entirely for outside lighting it is not intended that the lights be "turned down" at any time, as it is not customary to turn such lights so as to dim them. Flow of gas to the compartment E is regulated by valve 12. After the device is charged this valve is opened and then the burner valves, access to which is gained through the door 32. If at any time only one burner is desired the other—if a two burner bracket is used, is turned out, and the valve 12 turned half off, feeding only the one burner. At daybreak the party having charge of the lights turns valve 12 entirely off, thus putting out the lights, or permitting them to go out after the gas supply in compartment E is exhausted. To relight, it is only necessary to turn the gas on at the valve 12, open the door 32 and light the burners. The chains 30 need not be touched except to regulate the number of burners to be used.

The difference in pressure between the gas compartment E and the interior of the bell C is due to the height of water in water chamber A above the holes in sleeve 6, and this must be sufficient to cause the excess pressure in the bell to support the weight of the bell and its attachments.

If an excessive pressure should be generated and the bell should rise to a sufficient height to lift sleeves 7ª above the water line the surplus gas will flow into the blowoff pipe and through its various branches escaping into the outer air at the upper end of the pipe section 19 and at a considerable distance above the burners. To recharge, the cover with burner standard is removed, then the inner tank, and last of all the water tank is removed and cleaned. After recharging and cleaning the parts are replaced in reverse order to which they are removed.

The device can be readily removed as a complete street lighting unit from place to place, and is especially adapted for army use.

In the above description I have outlined in detail the essential features of my construction. It will be obvious that many small details of construction can be altered or omitted without making any material change in the device as a whole. For example openings 7ᵇ are formed in the sleeves 7ª so that gas will enter the sleeves and blow off pipe branches 7 without entirely withdrawing the sleeves from the water seal. These openings might be omitted and the same result secured by making the sleeves shorter, but as the movement of the bell is guided by rollers C' it is advisable to keep the upper ends of the pipe branches 7 within the sleeves, so that they also act as guides, and it is not advisable to lengthen the pipes, as in that case they would stop downward movement of the bell and interfere with the action of the carbid feeding device shown in the application previously referred to.

The gas pipes 4 and 13 may be considered as one pipe formed in two detached sections, and in the same way the various sections of the blow off pipe, indicated at 7, 21 and 19 may all be considered as parts of a common pipe, all branches exhausting through the one upper opening.

Any desired means may be employed for connecting the standard or pipe section 23 to the cover, threading it directly on the union 22 or connecting it by a coupling. The joining of the various pipes, etc., being merely the exercise of the skill usually employed by any good plumber, no claim is made for such details of construction and I do not wish to be limited to them.

What I claim is:—

1. In a portable acetylene generator, a gas generating compartment, a free gas compartment, a valve controlled pipe conducting gas to the last mentioned compartment, a cover therefor, a burner standard mounted on the cover and communicating with the free gas compartment, a blow-off pipe leading from the generator through the free gas compartment and through said standard to the outer air, a valve stem for the valve in the gas pipe first mentioned, said stem extending through the generator casing and interlocking with said cover, and locking means for said stem.

2. In a device of the kind described, a casing having therein a generating portion and a free gas compartment, a water chamber arranged concentric with said gas compartment, a cover having a double flange, one flange dipping into the water compartment and the other overlapping the exterior of the casing, said flanges having bayonet slots, a gas pipe leading from the generator, a communicating gas supply pipe leading to the free gas compartment, a valve in the last mentioned pipe, a rotatable valve stem, said stem extending through the casing and being normally engaged by the slots of the flanges, means for locking the stem against rotation, a light standard on the cover, and a blowoff pipe leading from the generator through the free gas compartment and through said standard to the outer air.

3. The combination with an acetylene gas generator, a removable cover having a burner standard thereon, a housing inclosing a portion of said standard, a door in said housing, pipes leading from the burner into said housing, pull chains leading from the burner valves into said housing and through said pipes, means for conducting gas from the generator to said standard, and a blowoff pipe leading from the generator through said standard to the outer air.

4. In a generator of the kind described, a casing, a water tank, a bell, a free gas compartment, a cover, a lighting standard carried by the cover, means for normally conducting the generated gas to the free gas compartment and thence into the standard, and a sectional blow off pipe extending into and through the free gas compartment and the standard, said pipe having one section carried by the cover and the other arranged in the casing, the two sections telescoping in a water seal, the section within the casing receiving surplus gas on rise of the bell beyond a predetermined height.

5. In a device of the kind described comprising an acetylene generating device and a hollow standard supporting gas burners and supplying gas thereto, a bell, a water seal into which said bell dips, depending sleeves carried within the bell and normally dipping into said water seal, and a blow off pipe having lower branches telescoping in said sleeves, and having an upper portion extending through said standard to the outer air at a point above the burners, as and for the purpose set forth.

6. In a device of the kind described, the combination with a generator casing, a double flanged cover for said casing, a light standard on the casing, a gas supply pipe supplying gas to said standard, a blow off pipe extending through said standard and to the open air, a valve in the supply pipe, a valve stem extending through the flanges of the cover and the generator casing, and means carried by the outermost flange for locking said cover to the valve stem and the stem against rotation.

In testimony whereof I affix my signature.

JAMES O. BEWAN.

Copies of this patent may be obtained for five cents each, by addressing the "Commissioner of Patents, Washington, D. C."